Aug. 10, 1943. F. AUTEM Re. 22,362

METHOD AND MEANS FOR APPLYING LABELLIKE ELEMENTS TO ARTICLES OF MANUFACTURE

Original Filed Oct. 22, 1938 13 Sheets-Sheet 1

INVENTOR:
Fred Autem,
BY Alfred E. Eschenfelder
ATTORNEY.

Aug. 10, 1943. F. AUTEM Re. 22,362

METHOD AND MEANS FOR APPLYING LABELLIKE ELEMENTS TO ARTICLES OF MANUFACTURE

Original Filed Oct. 22, 1938 13 Sheets-Sheet 2

INVENTOR:
Fred Autem,
BY Alfred E. Dickinson,
ATTORNEY.

Aug. 10, 1943. F. AUTEM Re. 22,362

METHOD AND MEANS FOR APPLYING LABELLIKE ELEMENTS TO ARTICLES OF MANUFACTURE

Original Filed Oct. 22, 1938 13 Sheets-Sheet 3

Aug. 10, 1943. F. AUTEM Re. 22,362

METHOD AND MEANS FOR APPLYING LABELLIKE ELEMENTS TO ARTICLES OF MANUFACTURE

Original Filed Oct. 22, 1938 13 Sheets-Sheet 4

INVENTOR:
Fred Autem,
BY Alfred E. Dickinson,
ATTORNEY.

Aug. 10, 1943. F. AUTEM Re. 22,362
METHOD AND MEANS FOR APPLYING LABELLIKE ELEMENTS TO ARTICLES OF MANUFACTURE
Original Filed Oct. 22, 1938 13 Sheets-Sheet 5
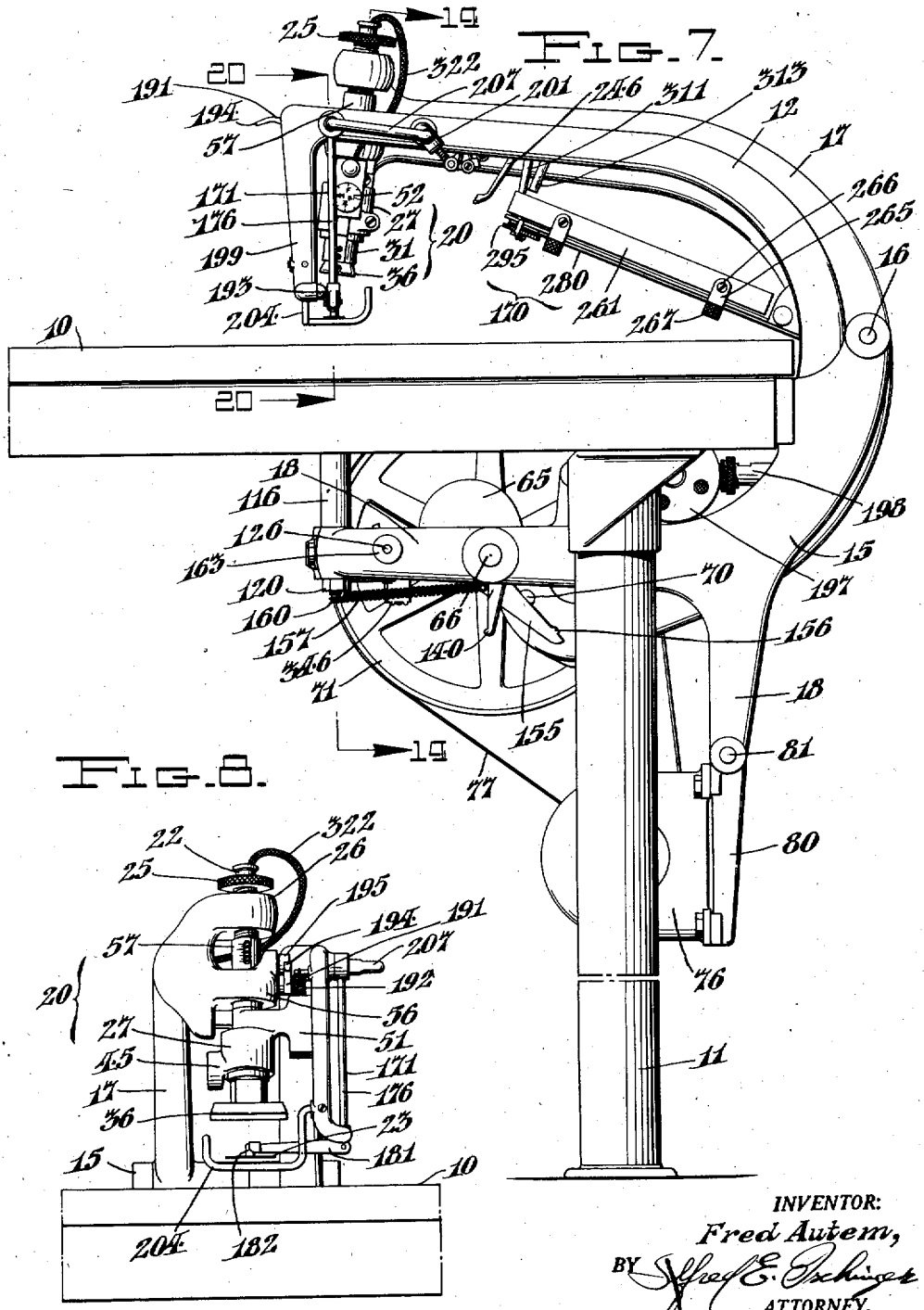
INVENTOR:
Fred Autem,
BY Alfred E. Ischinger
ATTORNEY.

Aug. 10, 1943. F. AUTEM Re. 22,362

METHOD AND MEANS FOR APPLYING LABELLIKE ELEMENTS TO ARTICLES OF MANUFACTURE

Original Filed Oct. 22, 1938 13 Sheets-Sheet 6

INVENTOR:
Fred Autem,
BY Glenn E. Dickinson
ATTORNEY.

Aug. 10, 1943. F. AUTEM Re. 22,362

METHOD AND MEANS FOR APPLYING LABELLIKE ELEMENTS TO ARTICLES OF MANUFACTURE

Original Filed Oct. 22, 1938 13 Sheets-Sheet 7

INVENTOR:
Fred Autem,
BY Alfred E. Ischinger
ATTORNEY.

Aug. 10, 1943. F. AUTEM Re. 22,362

METHOD AND MEANS FOR APPLYING LABELLIKE ELEMENTS TO ARTICLES OF MANUFACTURE

Original Filed Oct. 22, 1938 13 Sheets-Sheet 8

INVENTOR:
Fred Autem,
BY Alfred E. Jackinger
ATTORNEY.

Aug. 10, 1943. F. AUTEM Re. 22,362

METHOD AND MEANS FOR APPLYING LABELLIKE ELEMENTS TO ARTICLES OF MANUFACTURE

Original Filed Oct. 22, 1938 13 Sheets-Sheet 9

INVENTOR:
Fred Autem,
BY Alfred E. Oschinger
ATTORNEY.

INVENTOR:
Fred Autem,
BY Alfred E. Jackinger
ATTORNEY.

INVENTOR:
Fred Autem,
BY Alfred E. Oschinger
ATTORNEY.

Aug. 10, 1943. F. AUTEM Re. 22,362

METHOD AND MEANS FOR APPLYING LABELLIKE ELEMENTS TO ARTICLES OF MANUFACTURE

Original Filed Oct. 22, 1938 13 Sheets-Sheet 12

INVENTOR:
Fred Autem,
BY Alfred E. Ashinger,
ATTORNEY.

INVENTOR:
Fred Autem,
BY Alfred E. Orchinger
ATTORNEY.

Reissued Aug. 10, 1943

Re. 22,362

UNITED STATES PATENT OFFICE 22,362

METHOD AND MEANS FOR APPLYING LABELLIKE ELEMENTS TO ARTICLES OF MANUFACTURE

Fred Autem, Mount Penn, Pa., assignor to Textile Machine Works, Wyomissing, Pa., a corporation of Pennsylvania Original No. 2,265,769, dated December 9, 1941, Serial No. 236,386, October 22, 1938. Application for reissue June 2, 1942, Serial No. 445,448

38 Claims. (Cl. 216—55)

The present invention relates to means for and method of applying indicia to articles of manufacture and more particularly to a method of applying labels to articles of manufacture and to a machine therefor.

Machines and methods have been proposed for applying labels, stamps and the like having water soluble adhesive thereon to other objects, but difficulty has been encountered in applying labels to articles such as garments which are washed from time to time, because the washing would cause the labels to become ungummed. Furthermore, an adhesive causing the labels to adhere to one another when in a stack or pile makes it impossible to use the desirable method of feeding the labels from a stack. It is therefore almost universally the practise in the cloth trades to use cloth labels and to sew them on garments and other cloth articles.

It is an object of this invention to provide a novel method of and means for applying sticker elements to articles of manufacture.

Another object of my invention is to provide a means for attaching indicia bearing labels to cloth by water insoluble adhesive permitting the labels to be stacked.

While it is known to remove labels, sheets and the like from a pile or stack one by one for application to articles to be labelled, the mechanisms heretofore known have not been satisfactory for certain purposes and especially under circumstances requiring pressure to be maintained on a given area continuously for a material period, as is required when attaching a label to an article by an adhesive of the heat softened type.

It is another object of the present invention to provide an improved means for removing labels or the like from a magazine and more particularly one which is adapted to cooperate with a presser head regardless of the time pressure is applied by the head during a cycle of operation.

It is still another object of the invention to provide a labelling machine adapted to apply heat and pressure to machine fed labels.

It is still another object of the invention to provide a stamping or pressing mechanism the time period of which may be varied as desired within considerable limits.

Also, it is an object of my invention to provide a magazine or hopper for labels or the like, in a machine for applying them to articles of manufacture, which shall be removable from the machine and also adjustable to accommodate labels or the like of different sizes.

Another object of my invention is to provide means whereby the angle to the horizontal of a magazine or hopper may be shifted, and also a stack of labels moved along the magazine by mechanical means.

It is a further object of the invention to provide an improved means for moving a stack of labels in a magazine.

With these and other objects in view, which will become apparent from the following detailed description of the illustrative embodiment of the invention shown in the accompanying drawings, my invention resides in the novel elements, features of construction and arrangement of parts in cooperative relationship as hereinafter more particularly pointed out in the claims.

In the drawings:

Fig. 7 is a side elevational view of the label applying device as viewed from the right of Fig. 1;

Fig. 8 is a front elevational view of the upper part of the device as viewed from the left of Fig. 7;

Figure 1:
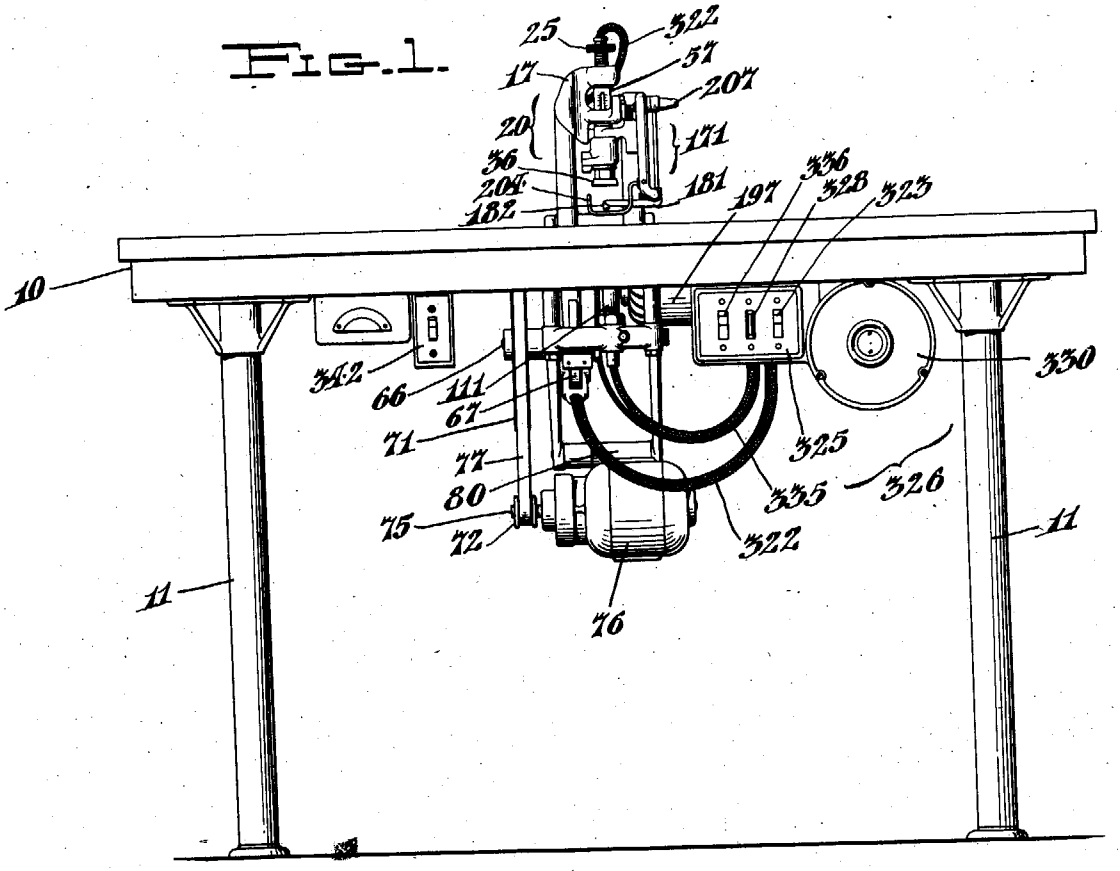
Figure 1 is a front elevational view of a label applying device constructed in accordance with my invention.
Figure 2:
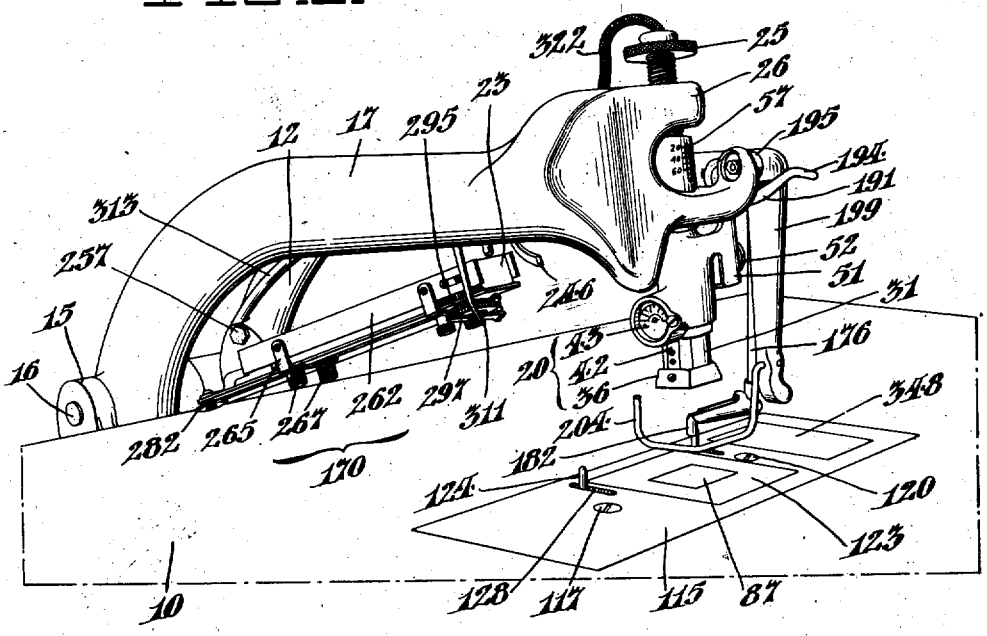
Fig. 2 is a perspective view taken from the left of Fig. 1, of the portion of the device shown above the table top.

A sticker element, etc., applying apparatus in accordance with my invention comprises a movable head, which may or may not be heated, having a stamping or pressure shoe or platen thereon, a platen area, which may or may not be heated, against which the shoe or other platen presses during a given part of the cycle of the machine, and a transfer head arranged to withdraw a label or like sheet-like object from a magazine containing a stack or pile of labels and transfer it to the platen area. Preferably, the transfer head operates on the suction principle, but whether it does or not, it is preferably adapted to pass into the magazine to some extent to contact a label to be withdrawn therefrom. Further, the magazine is preferably furnished with a novel form of feeding mechanism adapted to cooperate with the transfer head to facilitate removing labels from the magazine. In the arrangement shown, the label feeding and transfer mechanisms are maintained in timed relation to the movements of the movable head.

Referring to the drawings and more particularly to Figs. 1, 2, 5 and 7, a table top 10, supported by legs 11, has secured thereto a stationary arm 12 by means of a bracket 15 having arms 18 and 19. A pin 16 carried by the arms 18 and 19 of the bracket pivotally supports a movable arm 17, one end of which carries an upper head 20 having a platen for cooperation with a platen of a lower head 21 carried in the table top 10, the platens of the upper and lower heads being heated to a predetermined temperature to vulcanize a label or other gummed element 23 to cloth articles such as underwear, sweaters, tablecloths and the like.

Figures 14, 15, 16:
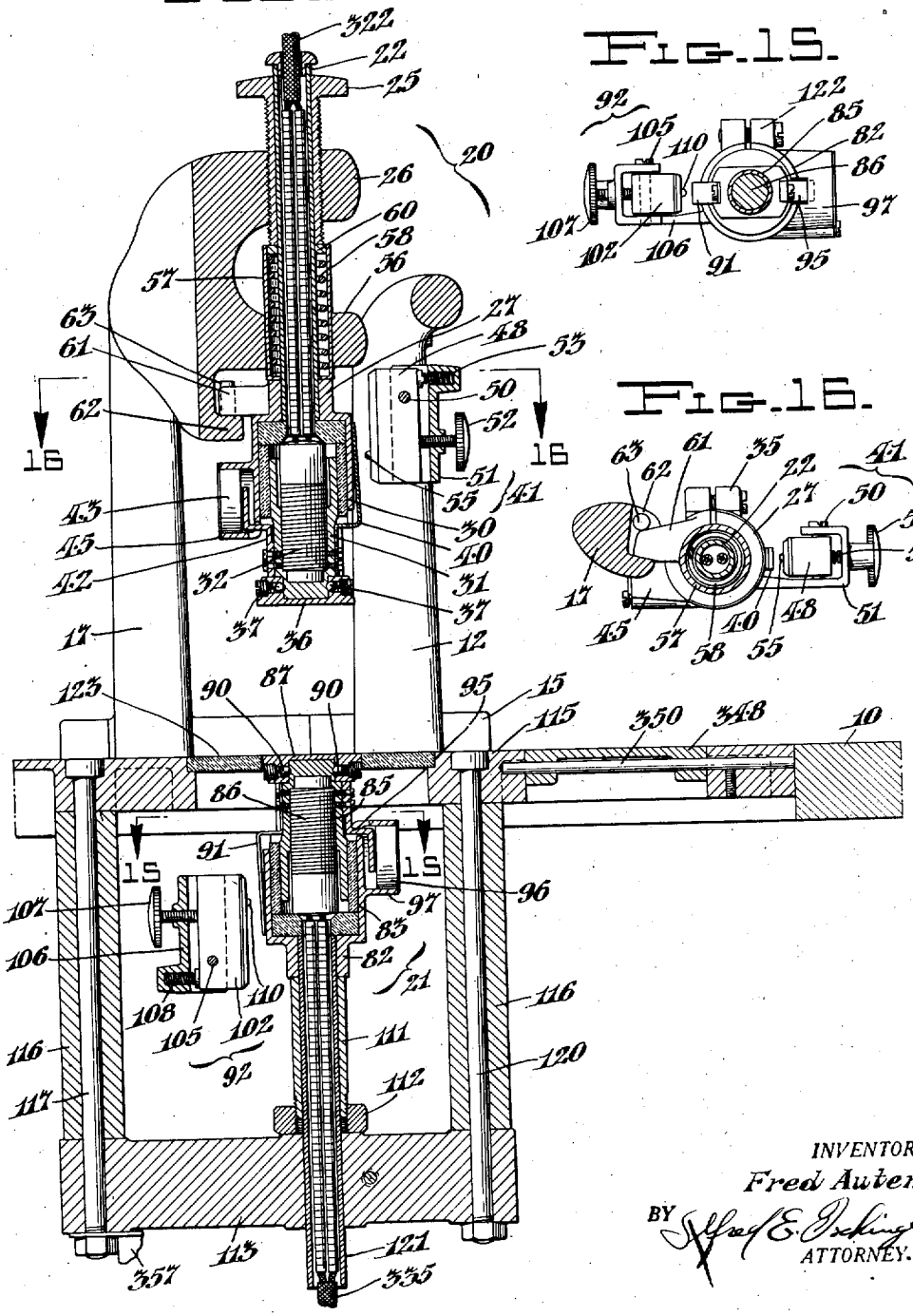
Fig. 14 is a sectional view taken along the line 14—14 of Fig. 7.
Fig. 15 is a sectional view taken along the line 15—15 of Fig. 14.
Fig. 16 is a sectional view taken along the line 16—16 of Fig. 14.

The head 20, Fig. 14, comprises a tube-like element 22 slidably mounted in an externally threaded bushing 25 adjustably carried by a lateral extension 26 of the arm 17. The tube 22 carries at the lower end thereof a housing 27 which carries a cup-like element 30 of heat resisting material, such as asbestos, in which is disposed a cylindrical member 31 having mounted therein a resistor heater 32. The housing 27 is split longitudinally at one side and is provided with a clamp and screw arrangement 35 (Fig. 16) by means of which the housing is secured to the tube 22, and the resistor heater carrying member 31 is secured to the housing. The member 31 has detachably secured thereto, a platen or stamp member 36 as by spring pressed ball detents 37. Secured to the element 31 is a heat responsive device or bimetallic element 40 for cooperation with a switch 41, and a member 42 for cooperation with a thermometer 43 carried by an extension 45 of the housing 27. The switch 41 comprises a movable contact member 46 and a stationary contact member 47, shown diagrammatically in Fig. 52, both of which are carried by a member 48, Fig. 14, that is pivotally mounted on a pin 50 in turn carried by an extension 51 of the housing 27, Fig. 16. An adjusting screw 52, carried in the extension 51 limits the counterclockwise movement of the member 48, in which direction the member is biased by a spring 53. A button 55 of the member 48, Figs. 14 and 52, cooperates with the bimetallic element 40 to open the switch 41 when the platen 36 reaches a certain temperature as determined by the position of the screw 52. The thermometer 43 is of the bimetallic element type and is operated by the member 42 to indicate the degree of heat in the platen 36 and its reading is useful in adjusting the switch 41.

A second lateral extension 56 of the arm 17 is provided with a bore in which is slidably mounted a cylindrical member 57, the lower end of which is turned inwardly to provide a seat for a spring 58 disposed within the member 57 and around the tube 22, said lower end of member 57 abutting the upper surface of the housing 27. A washer 60 also disposed within the member 57 and around the tube 22 abuts the lower end of the threaded bushing 25 so as to act as an upper seat for the spring 58. The housing 27 is provided with a guide arm 61 which is slidably mounted between one wall of an apertured portion 62 of the arm 17 and a pin 63 mounted on the portion 62 within the aperture, the lower wall of the portion 62 providing a stop, against which the guide arm 61 is biased by the spring 58, to limit the downward movement of the head 20 relative to the arm 17 when the head 20 is in its raised or inoperative position. In order to adjust the pressure of the shoe 36 upon the label, and the article to which it is being applied, when the two platens come closest, the threaded bushing 25 is turned to move it upwardly or downwardly relative to the arm 17, to thereby increase or decrease the compression of spring 58 against washer 60. The cylindrical member 57 is provided with a graduated scale, Fig. 8, whereby to facilitate adjustment of the spring 58 by indicating the pressure applied to the lable 23 by the platen or shoe 36.

Figure 6:
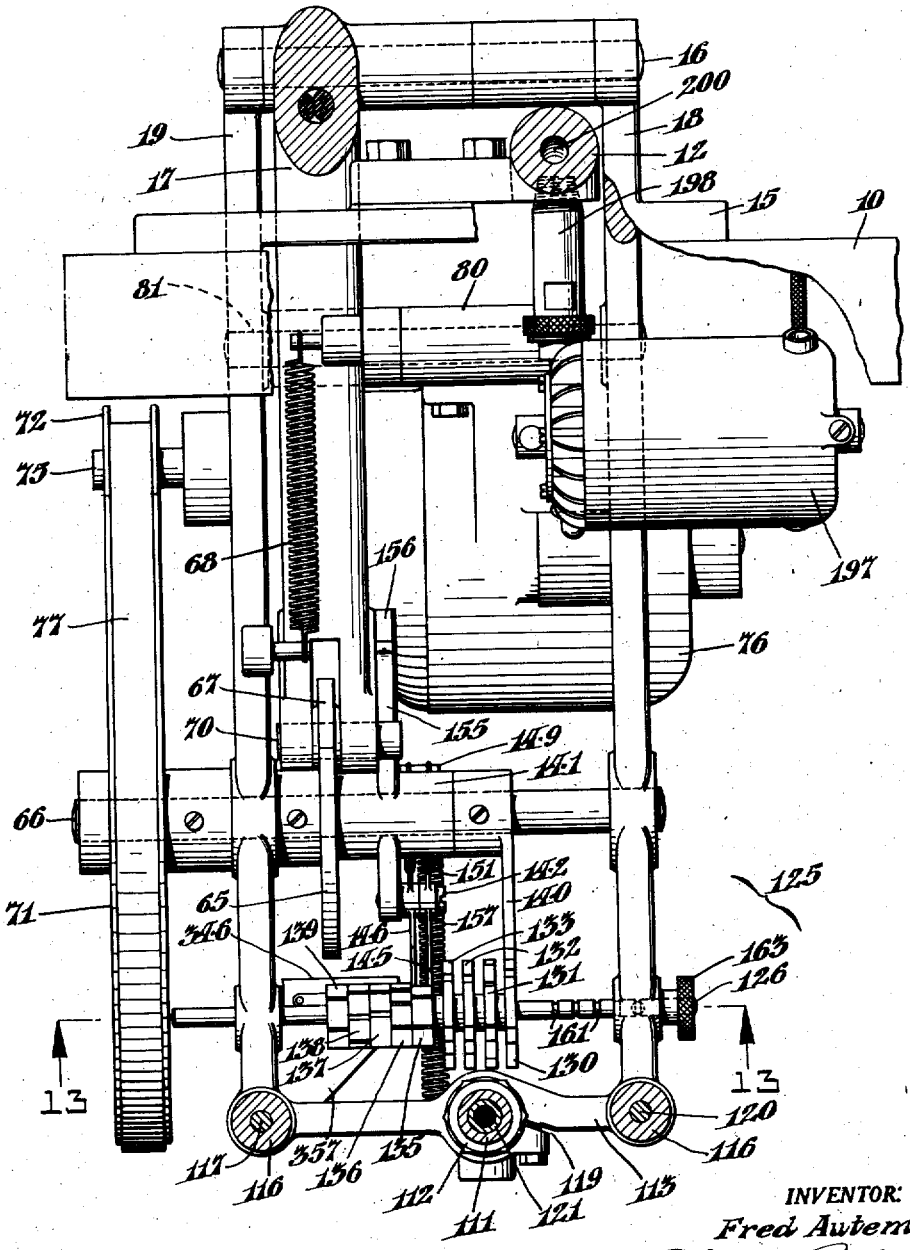
Fig. 6 is a top plan view of a portion of the device shown beneath the table top in Fig. 1, certain parts being shown in section.

In order to move the upper head 20 into cooperative relation with the lower head 21, the arm 17 is actuated by a cam 65, Fig. 7, carried by a cam shaft 66 rotatably supported in the arms 18 and 19, the cam 65 coacting with a cam follower 67 (Fig. 9) rotatably mounted on a pin 70, in turn carried in the lower end of the lever 17. The cam follower 67 is biased toward engagement with the cam 65 by a spring 68 connected between the arm 17 and the arm 19 of the bracket 15. A drive wheel 71, secured to the cam shaft 66, is connected to and driven by a motor 76 through means of linkage comprising a pulley 72 (Fig. 6) carried by a shaft 75, and a belt 77. The motor 76 is carried by a bracket 80 which is pivotally supported on a shaft 81 (Fig. 7) in turn supported in the arms 18 and 19 of the bracket 15. By means of the above linkage, the cam shaft 66 is driven by the motor 76 to rotate the cam 65 to move the arm 17 counterclockwise from its position shown in Fig. 7 to the position indicated in Fig. 9, in which latter position the shoe 36 on upper head 20 has been moved into cooperative engagement with the platen of the lower head 21. Inasmuch as the arm 17 continues to move downwardly after the shoe 36 has engaged the label 23, the threaded bushing 25 is caused to press downwardly upon the washer 60 to further compress the spring 58, thereby applying the predetermined pressure to the label; meanwhile the guide arm 61 is moved upwardly away from the lower wall of the apertured portion 62 of the arm 17. From the foregoing it will be understood that since the travel of the arm 17 is always constant regardless of the setting of the spindle or bushing 25, that the degree of pressure applied by the shoe 36 is controlled directly by the setting of the threaded spindle 25. Thus, when the spindle is so positioned that the spring 58 is not compressed when the head 20 is in its inoperative position, the pressure exerted by the shoe 36 upon the label and fabric will be negligible; whereas if the threaded spindle 25 is lowered in the arm 17 so as to compress the spring 58, then the pressure applied by the shoe on the label and fabric when the shoe is lowered into engagement therewith will be correspondingly increased.

The lower die head 21 (Fig. 14) comprises a housing 82 which carries a cup-like element 83 of asbestos or other heat resisting material in which is disposed a cylindrical member 85 and a resistor heater 86 mounted within the cylindrical member. The cylindrical member 85 has detachably mounted thereon a shoe or platen 87, as by spring pressed ball detents 90. Secured to the member 85 is a bimetallic element 91 for cooperation with a switch 92 and a member 95 for cooperation wth a thermometer 96 carried by an extension 97 of the housing 82. The switch 92 comprises movable and stationary contact members 100 and 101, respectively, shown diagrammatically in Fig. 52, carried by a switch member 102, Fig. 14, that is pivotally mounted on a pin 105 supported in an arm 106 of the housing 82, Fig. 15. An adjusting screw 107 carried in the arm 106, limits the counterclockwise movement of the switch member 102, in which direction the member 102 is biased by a spring 108. A button 110 on the member 102, Figs. 14 and 52, cooperates with the bimetallic element 91 to open the switch 92 when the platen 87 reaches a predetermined degree of temperature as controlled by the adjusting screw 107. The thermometer 96 is of the same type as the thermometer 43, heretofore described in connection with the upper die head 20, and is operated by the member 95 to indicate the extent of heat in the die shoe 87 and for adjusting the switch 92.

Figure 3:
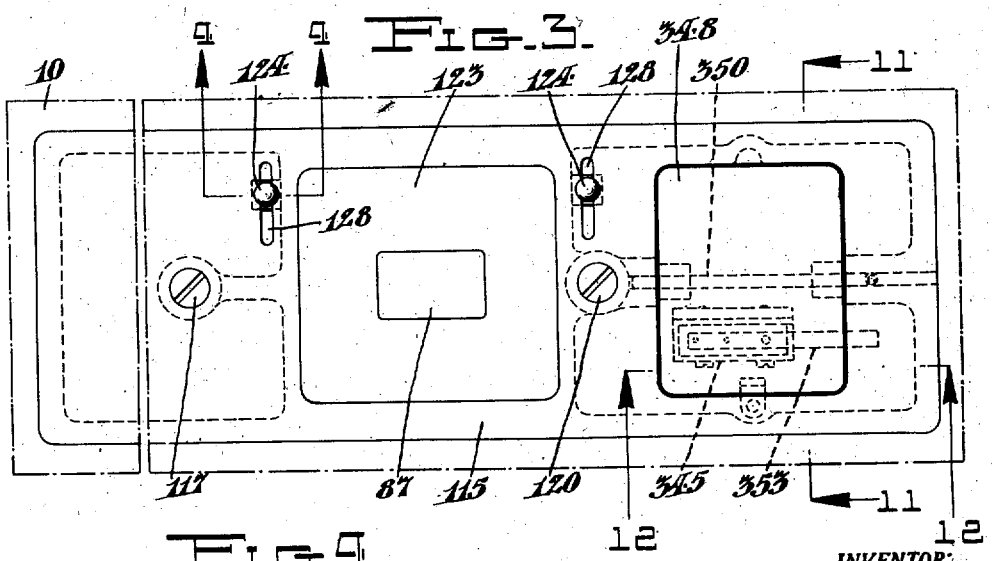
Fig. 3 is a top plan view of a portion of the table top.
Figure 4:
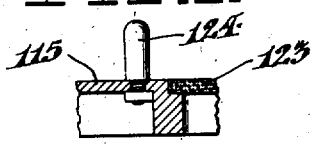
Fig. 4 is a sectional view taken substantially along the line 4—4 of Fig. 3.

A supporting tube 111, abutting the lower end of the housing 82, is adjustably carried in a threaded nut 112 supported on a cross arm portion 113 connecting the arms 18 and 19 of the bracket 15. With this arrangement the lower head 21 may be raised or lowered to maintain the platen 87 level with a plate member 115, which is in turn maintained on a level with the table top 10 by spacer elements 116 also supported on the cross arm portion 113 of the bracket 15, the member 115 and the spacer elements 116 being secured to the bracket 15 by means of nut and bolt devices 117 and 120. The head 21 is further supported by a tube 121, which extends through and is secured to the cross arm portion 113 by a split clamp and screw device 119 (Fig. 6), the tube 121 extending through supporting tube 111 and into the end of the housing 82 where it is held, together with the asbestos element 83 and the cylindrical member 85 in the housing by a split clamp and screw device 122 (Fig. 15) of the housing. The plate member 115 is provided with an insert 123 composed of asbestos or other insulating material to insulate the table against the heat of the platen 87; said plate member is also provided with locating pins 124, Figs. 2, 3 and 4, which are adjustably mounted in slots 126, and by means of which the garment may readily be located relative to the platens 36 and 87.

The upper head 20 may be maintained in cooperative relation with the lower head 21 for a predetermined period of time, corresponding to a predetermined number of revolutions of the cam shaft 66, to vulcanize, affix or unite the label to the article; said number of revolutions being determined by a pattern timing or control device 125, in the present instance manually operated, Figs. 6, 9, 10, 13 and 35 to 42 inclusive.

The pattern timing or control device 125 comprises a rod 126, mounted for rotative and axial movement in the arms 18 and 19 of the bracket 15, to which is secured a sleeve 127 having a series of ratchet portions 130 to 133, inclusive, the rod 126 also carrying a series of cam members 135 to 138, inclusive, located to correspond with the respective spacing of the ratchets, ratchet 130 cooperating with cam 135 in that it is active at the same time, ratchet 131 with cam 136, etc. Cooperating with the ratchets, one at a time, the one in use depending on the axial position of rod 126, is a pawl finger 140 (Fig. 6) secured to and rotatable with the cam shaft 66, the pawl being adapted to engage a tooth of ratchet 130, 131, 132 or 133 aligned therewith upon each revolution of the cam shaft 66 to thereby rotate the rod 126.

A lever 141 (Figs. 6 and 36), pivotally mounted on the cam shaft 66, between the cam 65 and the pawl or kicker arm 140, carries a stud 142 on which is pivotally mounted a pair of levers 145 and 146 for engagement with any one, such as the cam 135, of a series of cams 135, 136, 137 and 138 on rod 126, the lever 146 being biased toward the cam members 135, 136, 137 and 138 and against a pin 147 (Figs. 38, 40 and 42) carried by the lever 141, by a spring 150 connected between lever 146 and pin 149 to provide a yieldable connection between the levers 141 and 146. By maintaining the lever 146 against the pin 147, the lever 146 provides a cam follower portion for the lever 141. The lever 145 is biased into engagement with the cam 135, or other cam of the series, by a spring 151, the lever having a cutout portion 152, Fig. 36, to prevent engagement of the lever with the pin 147, thereby providing a detent means for engagement with the cams for preventing accidental displacement of the cam members and the rod 126; except for the cutout portion 152, the contours of the levers 145 and 146 are substantially identical. Each of cams 135, 136, 137 and 138 is wide enough axially of rod 126 to span the distance between levers 145 and 146 (Fig. 13), so that both levers may cooperate with a single given cam. The lever 141 has an extension 155 having a shouldered portion 156 arranged for latching engagement with one end of the shaft 70, the lever 141 being normally biased away from latching engagement with the shaft 70 by a spring 157, one end of which is connected to a pin 149 on the lever and the other end of which is connected to a pin 160 on the cross arm portion 113, the pin 149 also providing anchorage means for the springs 150 and 151. The pull of spring 157 is insufficient to overcome the combined pull of springs 150 and 151, consequently the free ends of the levers 145 and 146 are maintained in engagement with the operative cam, without however disturbing the normal position of said levers relative to the supporting lever 141.

Figure 9:
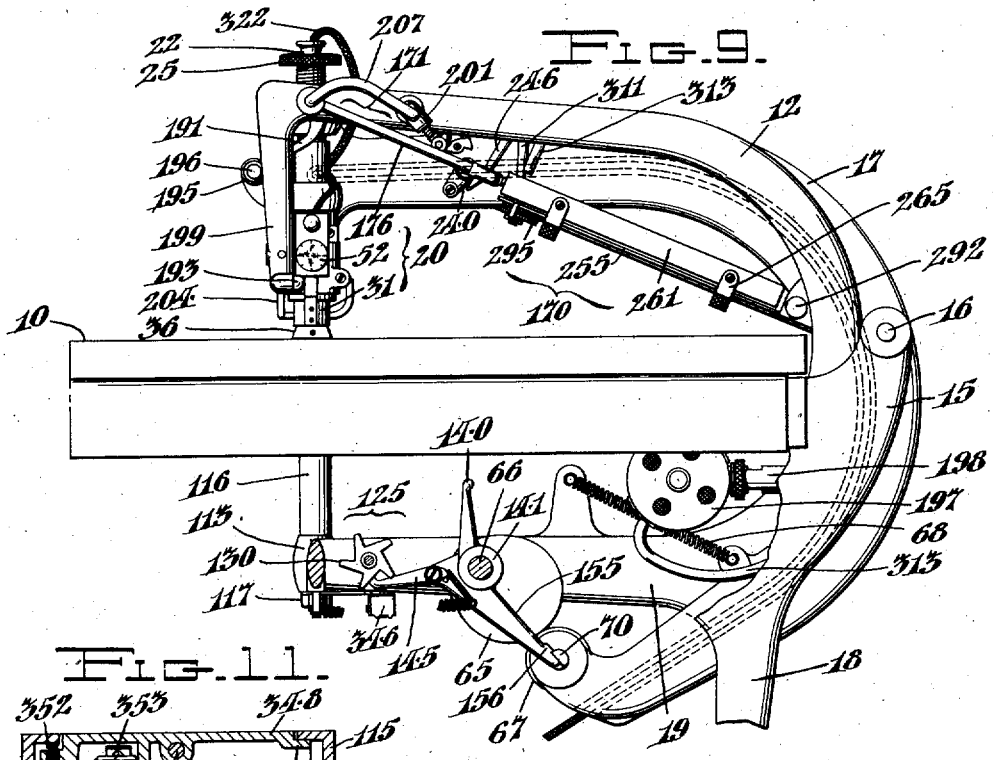
Fig. 9 is a view similar to Fig. 7, certain parts being broken away and other parts being in different operative positions.

Each of the cams 135 to 138 are provided with high and low cam surfaces 143 and 144, respectively (Figs. 36, 38, 40 and 42), or alternate high and low cam surfaces for cooperation with the cam follower levers 145 and 146, respectively, the periphery of the cams being provided with a predetermined number of notches corresponding to the number of teeth in the associated ratchet 130, 131, 132 or 133, respectively, the notches in the high surface or surfaces 143 of the cams cooperating with the levers 145 and 146 to determine the number of revolutions of the cam shaft 66 that the arm 17 will remain in the lowered position of Fig. 9, this position being maintained by the latching engagement of the shouldered portion 156, of the lever extension 155, with the shoulder 156 at one end of the shaft 70 of the arm 17. The low surface or surfaces 144 of the cams cooperate with the levers 145 and 146 to disengage the shouldered portion 156 from the shaft 70, whereupon the arm 17 is moved to its raised or inoperative position.

For example, the cam member 135 (Fig. 36) is provided with a high portion 143, having four notches, and a low portion 144 having one notch. When the device is placed into operation, the cam shaft 66 is rotated by the motor 76 to bring the pawl 140 into engagement with one of the teeth of the ratchet 130 which action rotates the associated cam member 135 from the position in which the levers 145 and 146 are in engagement with the low surface 144, Fig. 10, to the position in which the levers 145 and 146 are in engagement with one of the notches in the high surface 143, Fig. 36. It will be seen in Fig. 36 that with this action the extension 155 of the lever 141 has been thrown toward the shaft 70 against the pull of spring 157 by the cam 135, the end of the lever 146 being biased against the pin 147 by the spring 150 so that levers 146 and 141 act normally as a unit. As the cam shaft continues to rotate, the arm 17 will be moved in a counterclockwise direction by the cam 65, from the position of Fig. 7 to the position of Fig. 9, at which time the shouldered portion 156 of the lever 141 will engage the shaft 70 to hold the arm in the position of Fig. 9. Thus the arm will be maintained in this lowered position for four revolutions of the cam shaft since one revolution of the cam shaft is effected for each notch in the high surface 143 of the cam 135. While levers 145 and 146 are on cam 135, pawl 140 is in the same plane with and acts on ratchet 130 so as to turn rod 126 the distance between two successive teeth at each rotation of shaft 66. Each ratchet 130, 131, etc., has as many teeth as there are notches in the corresponding cam member 135, 136, etc. As the cam 135 is pawled to move levers 145 and 146 from the last notch in the high surface to the notch in the low surface 144, the pressure of the spring 58 in the upper head 20 and the spring 68, will maintain the arm 17 in latched position until the cam 65 relieves this pressure sufficiently for the spring 157 to bias the lever 141 out of latching engagement with the pin 70, whereupon the upper head 20 will be moved to the raised or inoperative position shown in Figs. 1, 2, 7 and 36, meanwhile the cutout portion 152 on the lever 145 permits the latter to engage the notched portion of the cam 135 and thus prevent accidental rotation thereof.

Figure 37:
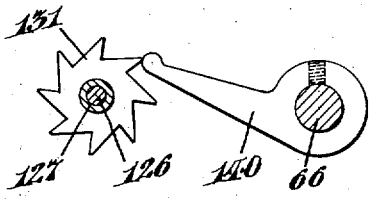
Figs. 37 and 38 are views similar to Figs. 35 and 36, respectively, of another of the control cams and the operating ratchet therefor.
Figure 38:
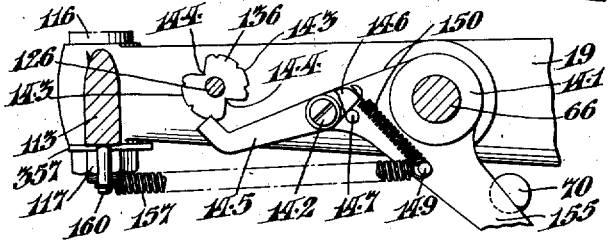

In Fig. 38, the levers 145 and 146 are shown as being arranged coplanar with the cam member 136, which is provided with two high cam surfaces 143, each having three notches, and two low surfaces 144. Fig. 37 shows the pawl 140 in the plane of the ratchet 131 having teeth equal in number to the number of notches in the high and low surfaces 143 and 144. The ratchet 131 being in use at the same time as cam member 136, the cam 136 maintains the die head 20 in a lowered position for three revolutions of the cam shaft as determined by the three notches in each of the high surfaces of the cam member 136, and meanwhile the cut-out portion 152 on the lever 145 permits the latter to engage the notched portion of the cam 136 and thus prevent accidental rotation thereof.

Figure 39:
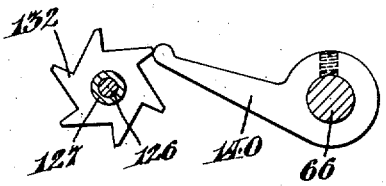
Figs. 39 and 40 are views similar to Figs. 35 and 36, respectively, showing a further control cam and operating ratchet therefor.
Figure 40:
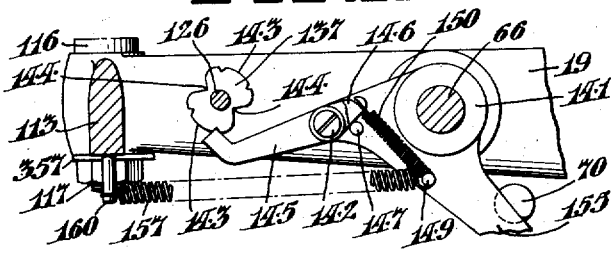

In Fig. 40, the levers 145 and 146 as shown in a position in which they embrace the central plane of the cam member 137, which is provided with two high cam surfaces 143, each having two notches and two low cam surfaces 144. Fig. 39 shows the pawl 140 in the same plane and cooperating with the ratchet 132 which is in use at the same time as cam member 137. The ratchet 132 has teeth equal in number to the number of notches in the high and low cam surfaces 143 and 144 in the cam 137, this cam maintaining the head 20 in a lowered or operative position for two revolutions of the cam shaft as determined by the two notches in each high surface of the cam member 137.

Figure 41:
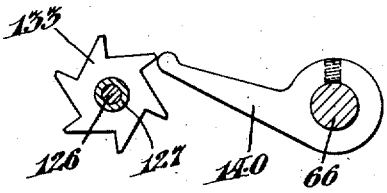
Figs. 41 and 42 are views similar to Figs. 35 and 36, respectively, of a still further form of control cam and operating ratchet therefor.
Figure 42:
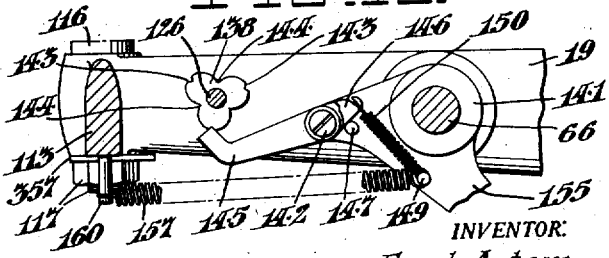

In Fig. 42, the levers 145 and 146 are shown in a position in which they embrace the central plane of the cam member 138, this cam member having three high cam surfaces 143, each having one notch, alternating with three low surfaces 144. Fig. 41 shows the pawl 140 in the same plane and cooperating with the ratchet 133 which is in use at the same time as cam member 138 and has six teeth, a number of teeth equal to the sum of the number of notches in the high and low surfaces 143 and 144 in the cam 138, this cam maintaining the head 20 in a lowered or operative position for only one revolution of the cam shaft as determined by the one notch in each high surface of the cam member.

The rod 126 is also provided with a further cam member 139, which has the same number and arrangement of high and low surfaces 143 and 144 as the cam member 135, for cooperation with the levers 145 and 146, there being however, no corresponding ratchet associated with this cam. When the cam member 139 has been placed in position to cooperate with the levers 145 and 146 upon the manipulation of a handle 163 while low portions 144 of the cams 135, 136, 137 and 138 are in alignment with each other and with the levers 145 and 146, as there is no ratchet associated with the cam, the cam member will remain stationary upon rotation of the cam shaft 66, and the levers 145 and 146 will remain in engagement with the low surface of the cam member. With this arrangement, upon rotation of the cam shaft 66, the die head will be lowered into operative position and immediately raised to its inoperative position whereby to adjust the pressure of the upper die head and other parts of the device without effecting a vulcanizing operation.

The rod 126 is provided with grooves 161 for cooperation with a spring pressed ball detent 162 carried in the arm 18 of the bracket 15, and a handle 163 by which the rod may be axially moved to cause any one of the cam members 135 to 139 to cooperate with the levers 145 and 146 and the corresponding ratchets 130 to 133 for the cam members 135 to 138, respectively, with the pawl 140.

Figure 20:
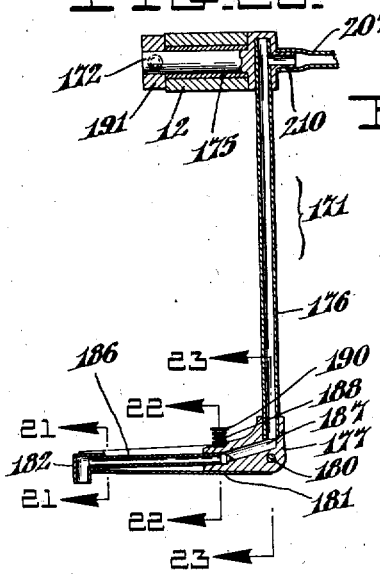
Fig. 20 is a sectional view of the label transfer arm taken along the line 20—20 of Fig. 7.
Figure 21:
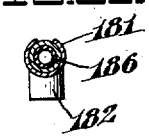
Fig. 21 is a sectional view taken along the line 21—21 of Fig. 20.
Figure 22:
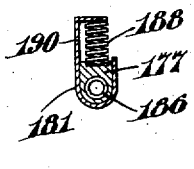
Fig. 22 is a sectional view taken along the line 22—22 of Fig. 20.
Figure 23:
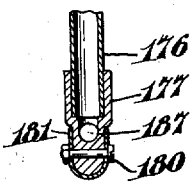
Fig. 23 is a sectional view taken along the line 23—23 of Fig. 20.
Figure 26:
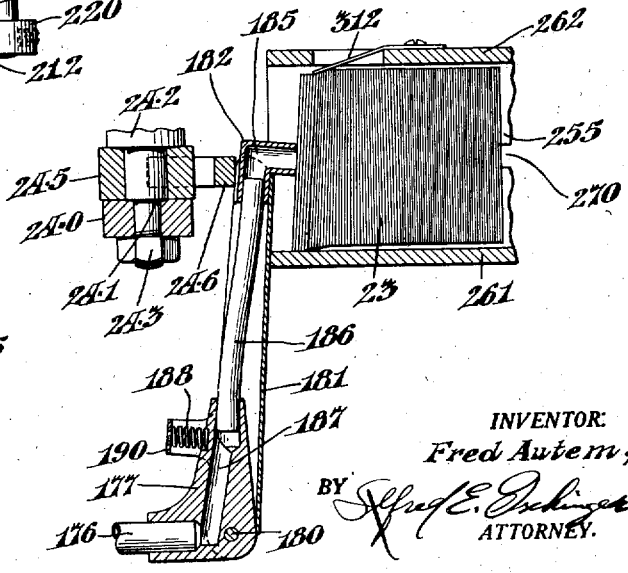
Fig. 26 is a view, on an enlarged scale, taken substantially along the line 26—26 of Fig. 19.
Figure 27:
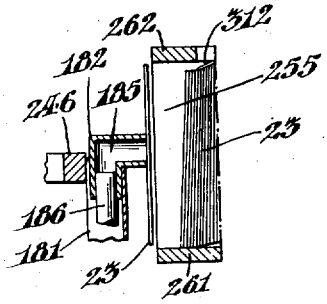
Fig. 27 is a view similar to a portion of Fig. 26, the elements shown in different operative positions.

Means are provided for feeding labels between the stamping shoe and platen automatically at each stroke of the upper head. The labels 23 are removed from a supply magazine 170 by transfer means 171 (Fig. 20) and transported to a position serving as a work or applying station to be pressed and vulcanized, affixed or united to the article or garment, by the heads 20 and 21. The means 171 comprises a bearing portion 172 which is pivotally mounted in a bushing 175 carried in and extending from one side to the other of the stationary arm 12. A tube-like element or arm 176 having one end thereof mounted in the portion 172, carries at its other end a bracket 177, Figs. 20 and 23. A stud 180 carried in the bracket 177 has pivotally mounted thereon a finger 181 carrying at its outer end a nozzle element or suction cup 182 having an aperture 185, Figs. 20, 21, 26 and 27, in which is disposed one end of a flexible tube element 186, as of rubber or the like, the other end of the tube being disposed in an air passage 187 in the bracket 177. A spring 188 disposed between the bracket 177 and an extension 190 of the finger 181, Figs. 22 and 26, normally biases the finger to the position shown in Fig. 20.

Secured to an end of the bearing portion 172 of the arm 176, is a lever 191 which is biased by a spring 192 in the clockwise direction so that the arm 176 is held normally in the label delivering position of Fig. 7 alongside and resting against the stop member 193 on the downwardly extending projection 199 of the arm 12. The downwardly extending projection 199 of arm 12 also carries a guard member 204 which functions to prevent accidental positioning of the operator's hands in the path of the moving head 20. A roller 195 pivotally mounted on stud 196 secured to the arm 17 near its outer end cooperates with the lever 191 on the downward movement of the arm 17 to swing the arm 176 from the position at which the label 23 is released from the nozzle 182 to the position in which the nozzle is in register with the supply magazine 170. The outer end of lever 191 is provided with a straight or dwell portion 194 along which the roller 195 rides, after the nozzle 182 has been moved into register with the supply magazine.

Figure 17:
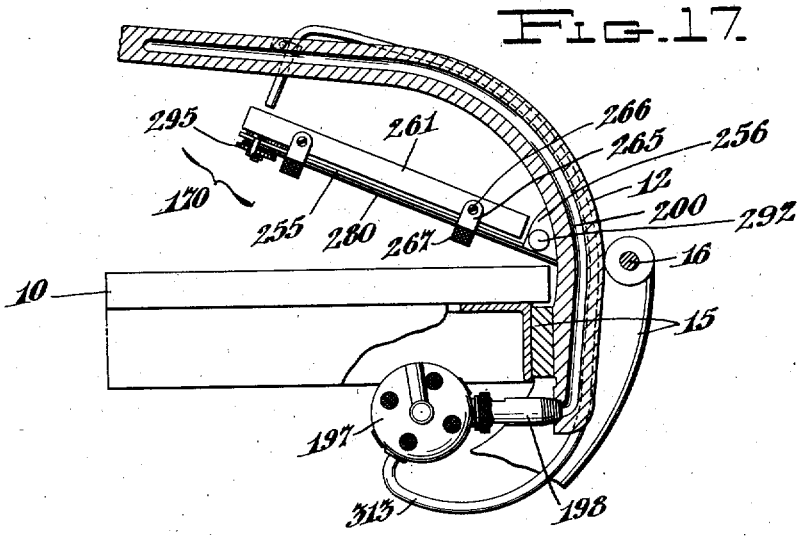
Fig. 17 is a sectional view taken along the line 17—17 of Fig. 5, slightly reduced in scale relative thereto.
Figure 24:
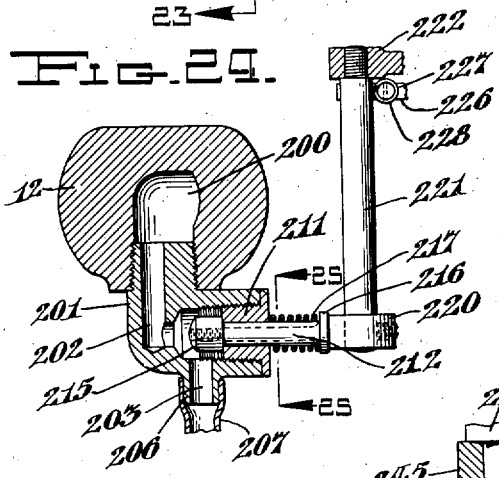
Fig. 24 is a cross sectional view of the air valve taken along the line 24—24 of Fig. 19, enlarged relative thereto.

A suction pump 197, Fig. 17, secured to the stationary arm 12 by means of connector 198 in register with an air passage 200 in the arm, provides suction or vacuum action to the nozzle 182 by which the label 23 is attached thereto to be removed from the magazine 170 and carried to a position over the garment. An air valve 201 (Figs. 18 and 24) also secured to the arm 12 is provided with an air passage 202 in register with the air passage 200 and an air passage 203 through a nozzle-like portion 206 of the vlave 201. A flexible hose 207 connects the portion 206 to a like portion 210 of the bearing portion 172 of the arm 176.

Figure 25:
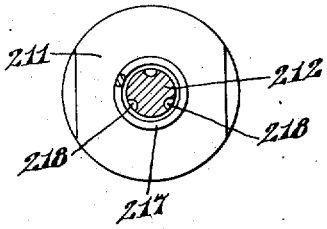
Fig. 25 is an enlarged sectional view taken along the line 25—25 of Fig. 24.

A bushing 211 threaded in the vlave 201 has slidably mounted therein a valve stem 212 having fixed at one end thereof a valve member 215 arranged to close the air passage 202, and at its other end a head 216. A spring 217 disposed around the valve stem 212 between the head 216 thereof and the bushing 211 normally biases the member 215 against the inner face of the bushing. The valve stem 212 is provided with axially extending grooves 218, Fig. 25, for purposes to be hereinafter set forth.

Figure 28:
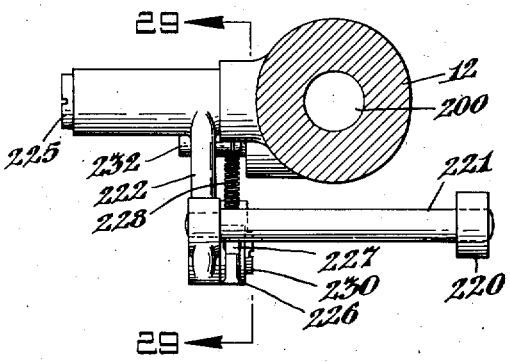
Fig. 28 is a sectional view taken substantially on the line 28—28 of Fig. 18.
Figure 29:
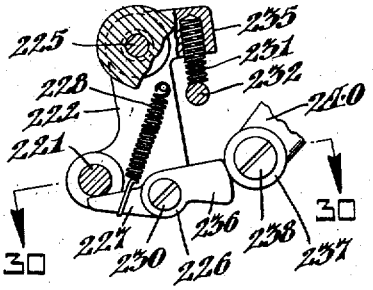
Fig. 29 is a sectional view taken substantially along the line 29—29 of Fig. 28.
Figure 30:
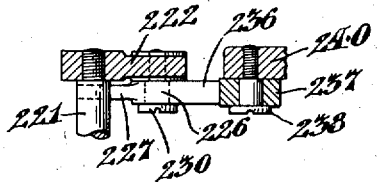
Fig. 30 is a cross sectional view taken substantially along the line 30—30 of Fig. 29.
Figure 31:
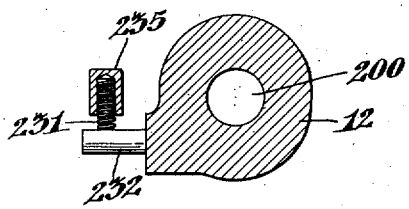
Fig. 31 is a sectional view taken substantially along the line 31—31 of Fig. 19.
Figure 32:
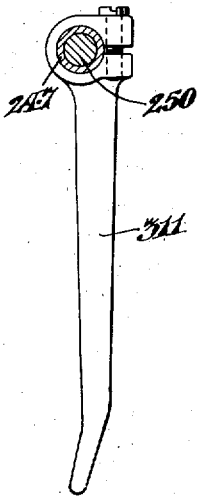
Fig. 32 is a detail view of the lever for operating the label applying magazine taken along the line 32—32 of Fig. 45.

A means is provided for automatically opening and closing valve 201. Such means comprises a collar 220 arranged for cooperation with the head 216 of the valve stem 212, which is carried at one end of a shaft 221 secured to a lever 222, Figs. 18, 28 and 29, rotatably mounted on a stud 225 carried by the stationary arm 12. A latch member 226, one arm 227 of which is normally biased into engagement with the shaft 221 by a spring 228, is pivotally mounted on a stud 230 secured to the lever 222, the lever 222 being normally biased in a counterclockwise direction by a spring 231 disposed between a pin 232 on the arm 12 and a projection 235 of the lever, Figs. 29 and 31. The latch member 226 is provided with a second arm 236 for cooperation with a roller 237 mounted on a stud 238, Fig. 30, carried by a lever 240 fixed between a shoulder portion 241 (Fig. 45) of a stud 242, carried in the arm 17, and a nut and washer device 243.

Figure 18:
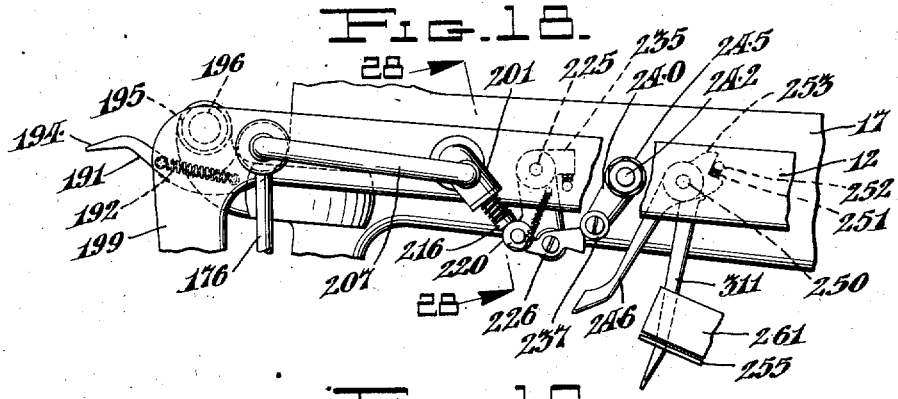
Fig. 18 is an enlarged detail view of the air valve and control mechanism therefor, shown in Fig. 7.
Figure 19:
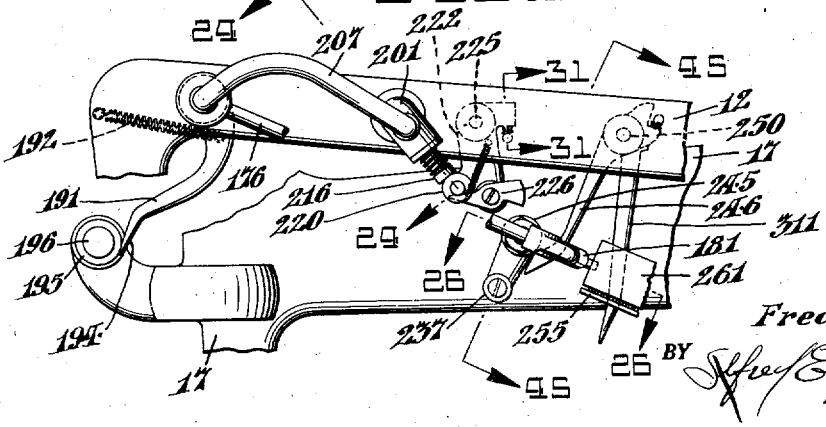
Fig. 19 is a view similar to Fig. 18, the parts being in different operative positions.
Figure 33:
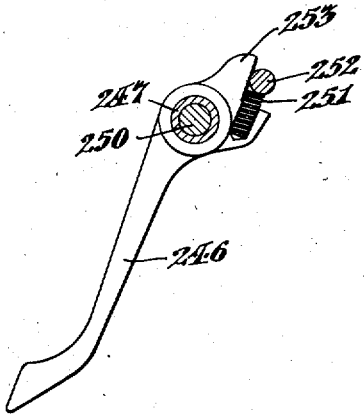
Fig. 33 is a sectional view taken along the line 33—33 of Fig. 45.
Figure 45:
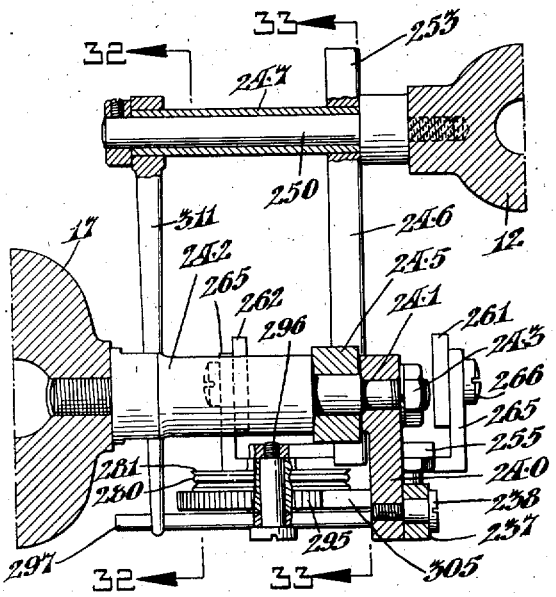
Fig. 45 is a sectional view taken substantially along the line 45—45 of Fig. 19.

A roller 245, rotatably mounted on a second shouldered portion of the stud 242, cooperates with a straight face on the lower end of a lever 246 secured to a sleeve 247 carried on a stud 250 fixed to the stationary arm 12, Figs. 18 and 45. The lever 246 is arranged to engage the finger 181 as shown in Fig. 19 when arm 176 has been swung back so as to press the nozzle element 182 directly toward and into engagement with the labels 23, Fig. 26. The lever 246 is biased in a clockwise direction by a spring 251 (Fig. 33) disposed between a recess in the lever and a pin 252 carried by the stationary bracket 16. The lever 246 is limited in its clockwise movement by engagement of a projection 253 of the lever, with the pin 252.

Figure 5:
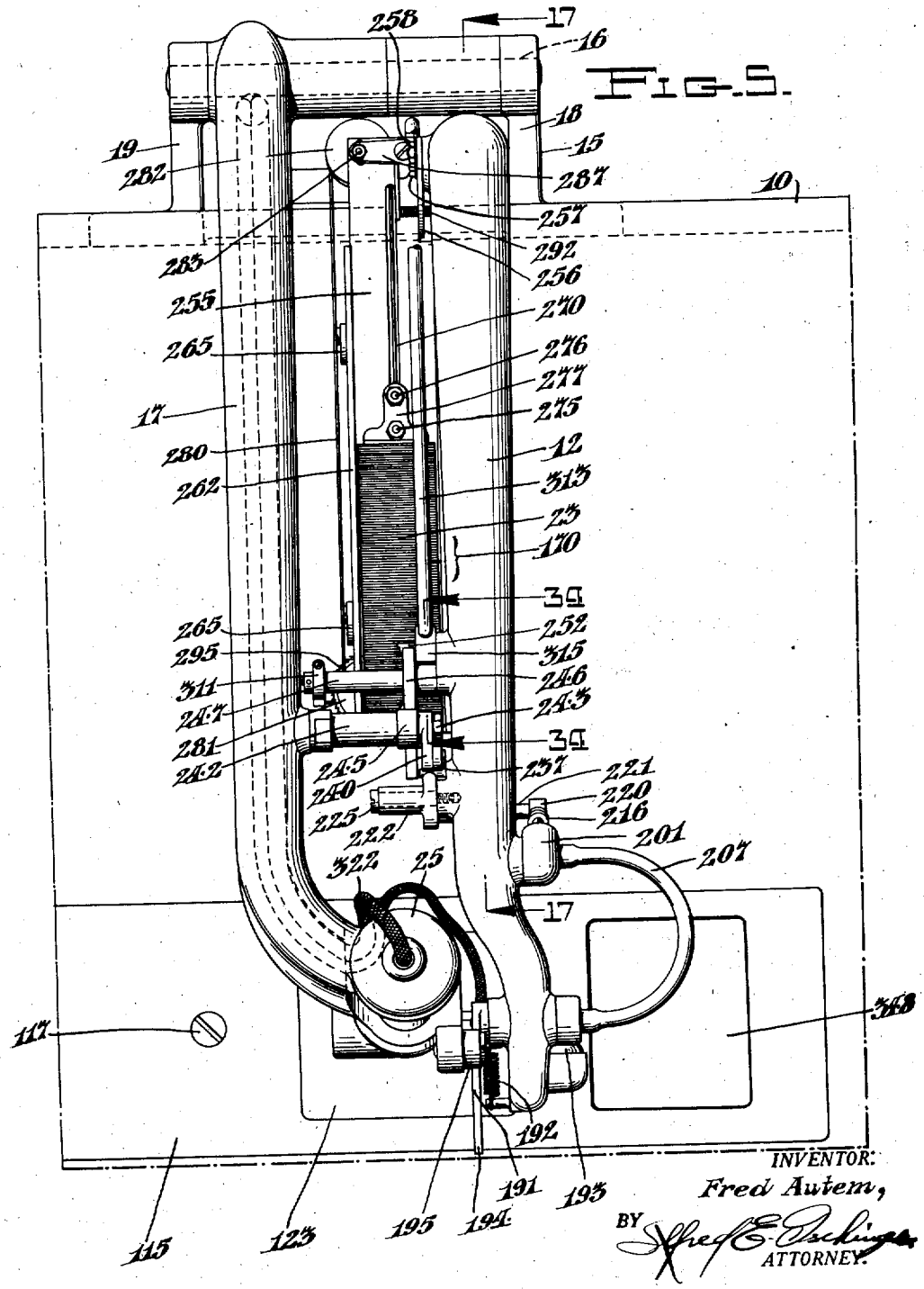
Fig. 5 is a top plan view of a portion of the device shown in Fig. 1 and enlarged relative thereto.
Figure 43:
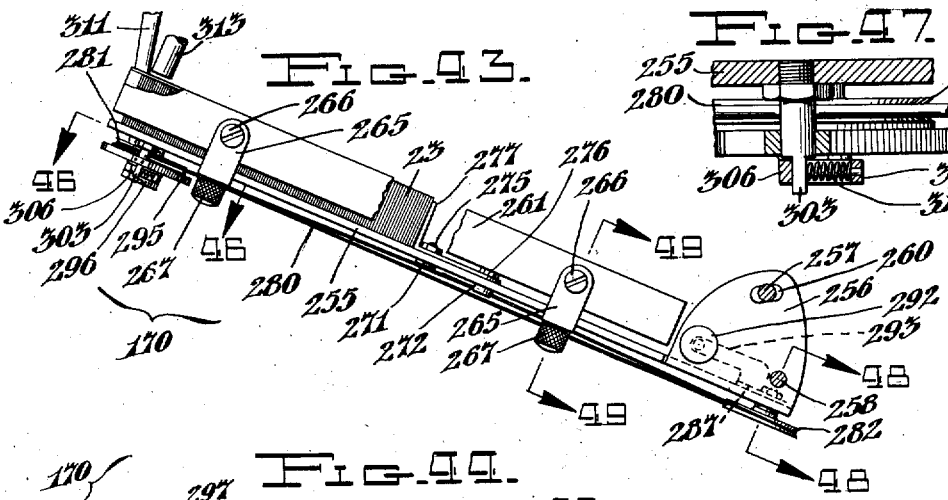
Fig. 43 is a detail view of the label magazine shown in Fig. 7, enlarged relative thereto, with certain parts broken away.
Figure 47:
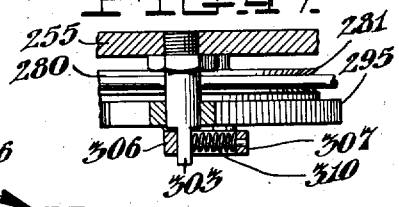
Fig. 47 is a sectional view taken along the line 47—47 of Fig. 46.
Figure 44:
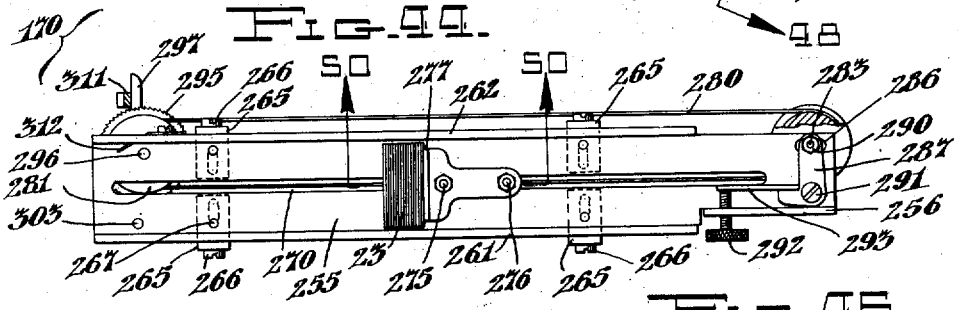
Fig. 44 is a top plan view of the mechanism shown in Fig. 43.
Figure 46:
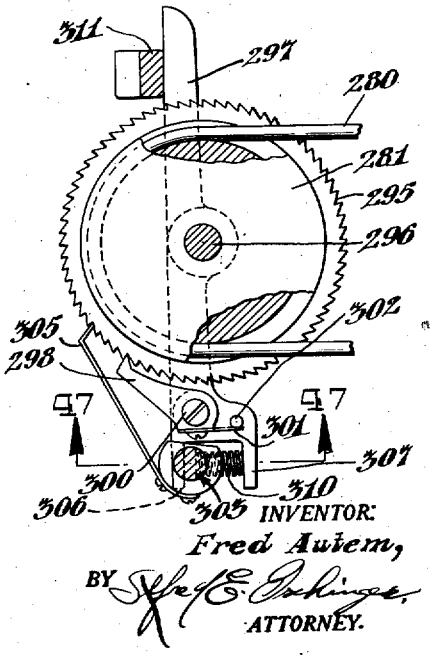
Fig. 46 is a view taken substantially along the line 46—46 of Fig. 43.

The label supply magazine 170, Figs. 5, 7 and 43 to 51, inclusive, comprises a bed plate 255 having an upright portion 256 thereof removably secured to the stationary arm 12 by means of screws 257 and 258, Figs. 5 and 43, the screw 257 extending through an arcuate slot 260 in the portion 256 so that the magazine 170 may be adjusted about the screw 258 to change the angular position of the label magazine relative to the table top 10. Side walls 261 and 262 are secured to angle members 265 as by screws 266 (Fig. 49), the angle members being adjustably secured to the bed plate, as by thumb screws 267, whereby the side walls may be adjusted transversely of bed plate 255 to compensate for the various sizes of labels. Slidably mounted in a slot 270 in the bed plate 255 are spacer elements 271 and 272 to which are securerd as by bolts 275 and 276, respectively, a pusher plate 277, Fig. 50, for supporting the labels on edge and for feeding the labels 23 on their one edges toward the front and of the magazine 170 which serves as a transfer station. The spacer elements 271 and 272 are provided with heads 273 and 274, respectively, arranged to cooperate with the underside of the bed plate, whereby to maintain the pusher plate in slidable engagement with the upper surface of the bed plate in its movement to feed the labels toward the nozzle element 182 when the arm 171 is in the label receiving position.

Figure 48:
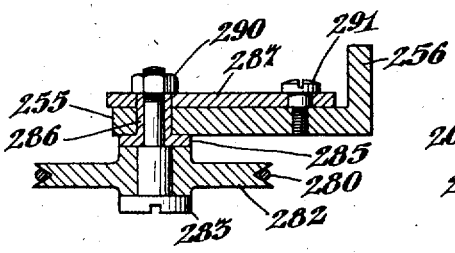
Fig. 48 is a sectional view taken substantially along the line 48—48 of Fig. 43.
Figure 49:
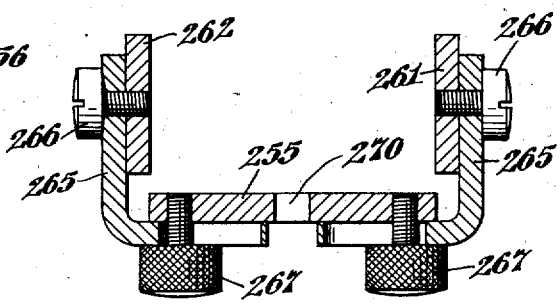
Fig. 49 is a sectional view taken along the line 49—49 of Fig. 43.
Figure 50:
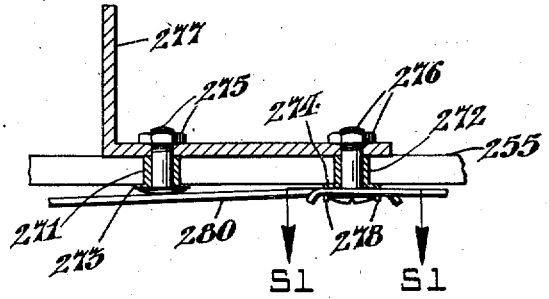
Fig. 50 is a sectional view taken along the line 50—50 of Fig. 44.
Figure 51:
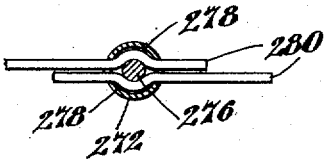
Fig. 51 is a view taken substantially along the line 51—51 of Fig. 50.

Both ends of a cord 280 are secured to the head 274 of the spacer element 272 by the bolt 276, the head 274 having downwardly extending portions 278 for preventing displacement of the cord from beneath the head of the bolt, said cord extending from the spacer element 272 around pulleys 281 and 282. The pulley 282 is pivotally mounted on a stud 283, the stud also carrying a spacer element 285 which extends through a slot 286 (Fig. 44) in the bed plate 255, and through an adjusting bracket 287 to which it is secured as by a nut 290 (Fig. 48). The bracket 287 is pivotally mounted on a shouldered stud 291 carried in the plate 255. An adjusting screw 292 (Fig. 44) mounted in the upright portion 256 of the plate 255 cooperates with an extension 293 of the bracket 287, whereby the pulley 282 may be adjusted to take up the slack in the cord 280.

The pulley 281 has a ratchet portion 295 and is rotatably mounted on a stud 296 (Fig. 44) which also pivotally carries a pawl lever 297 (Fig. 46), one end of which carries a pawl 298 for cooperation with the teeth of the ratchet portion 295. The pawl 298 is pivotally mounted on a stud 300, carried by the pawl lever 297, and is biased toward the teeth of the ratchet portion 295, by a plate spring 301 one end of which engages a pin 302 carried by the pawl lever. A stud 303 carried by the plate 255 supports a detent member 305 which cooperates with the teeth of the ratchet portion 295 to prevent accidental reverse movement thereof. Cooperating with the stud 303, is a projection 306 of the pawl lever 297 for limiting the counterclockwise movement of the pawl lever, as viewed in Fig. 46, and a second projection 307 between which and the stud 303, is disposed a spring 310 for biasing the projection 306 against the stud.

Figure 34:
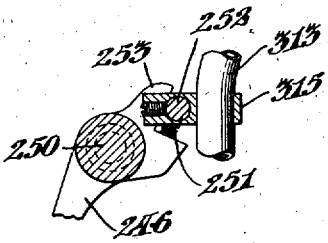
Fig. 34 is a sectional view taken substantially along the line 34—34 of Fig. 5.
Figure 35:
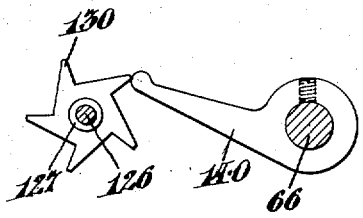
Fig. 35 is a detail view of a pawl and ratchet arrangement on the control mechanism of the label applying device.

The pawl lever 247 is operated to turn the pulley 281 in clockwise movement, by a lever 311 (Figs. 18, 32, 43, 45 and 46) mounted on the sleeve 247 carried by the stud 250 on fixed or stationary arm 12, to advance the pusher plate 277. With this arrangement the labels 23 are advanced so that the foremost label positively engages the nozzle element 182. The labels 23 are pressed against the side wall 261 by a baffle member 312 (Fig. 26) which is secured to the side wall 262 and which functions to facilitate the removal of the labels from the magazine. A hose 313 (Fig. 43) extends from the exhaust outlet of the pump 197 to a position over the forward end of the label supply, at which end it is supported by a bracket 315 which is secured to the pin 252, Fig. 34; the hose 313 directing a stream of air upon the foremost labels 23 flutters and consequently separates them to thereby facilitate removal of the uppermost label from the supply.

Figure 52:
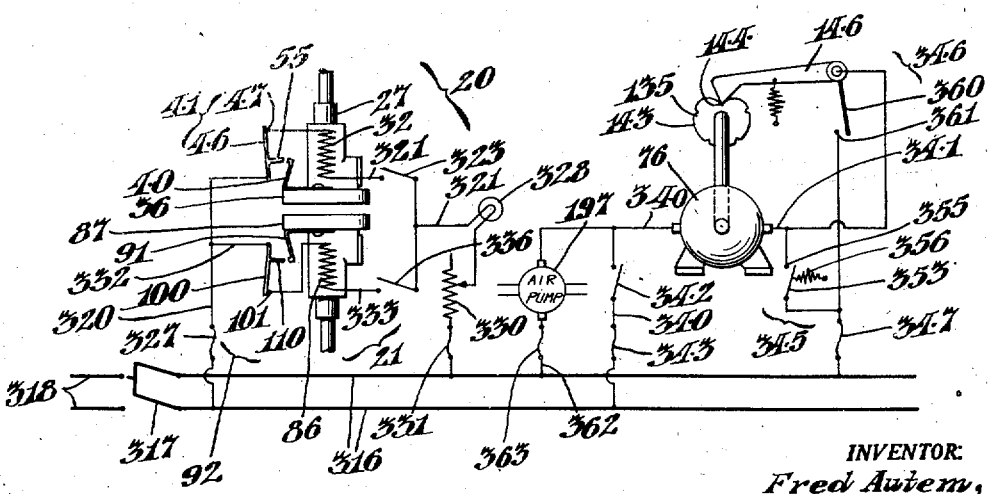
Fig. 52 is a diagram of the electrical circuits and parts associated with the device.

Referring to Fig. 52, the electrical parts of the top and bottom heads 20 and 21 are diagrammatically shown as being connected to a source of electromotive force through a service circuit 316, a master switch 317 and supply lines 318. Conductors 320 and 321 which are disposed in upper head 20, extend through the tube 22 and cable 322 (Figs. 1 and 14), which is partly in the arm 17, to a switch 323 in a switch box 325 of a control unit 326 in turn secured to the underside of the table top 10. The conductor 320 is connected to the service circuit 316 through a fuse 327 and the conductor 321 is connected to the service circuit 316 through the switch 323, a signal lamp 328, an adjustable rheostat 330 and a fuse 331. Conductors 332 and 333 (disposed partly in a cable 335) extend from the lower die head 21 through the tube 121 to a switch 336 in the switch box 325, to the conductor 321.

Figure 11:
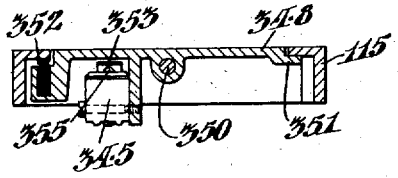
Fig. 11 is a cross sectional view of certain of the control mechanism of the label applying device taken substantially along the line 11—11 of Fig. 3.
Figure 10:
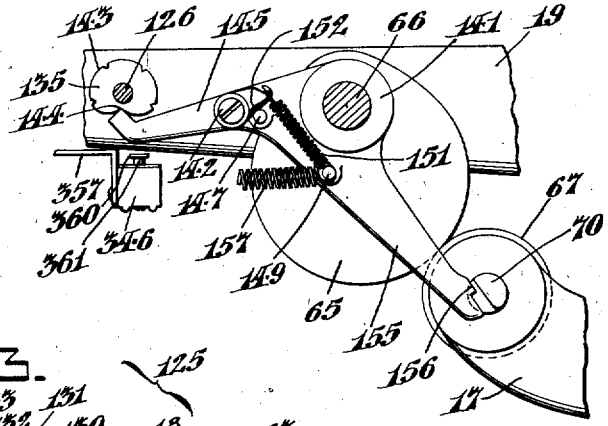
Fig. 10 is an enlarged detail view of the cam mechanism shown at the lower part of Fig. 9, but sectioned on a different plane from Fig. 9 and the parts being in different operative positions.
Figure 12:
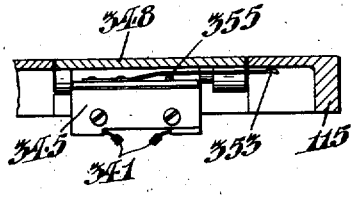
Fig. 12 is a sectional view taken substantially along the line 12—12 of Fig. 3.

Conductors 340 and 341 extend from the motor 76 to the service circuit 316. The conductor 340 is connected to the service circuit 316 through a switch 342, secured to the under side of the table top 10, and a fuse 343, and the conductor 341 is connected through switches 345 and 346 and a fuse 347 to the service circuit 316. The switch 345 is carried by a movable plate 348 (Figs. 11 and 12), pivotally mounted on a shaft 350 carried in the fixed plate 115, the plate 348 having a stop portion 351 normally biased against the underside of the plate 115 by a spring 352. The switch 345 is provided with a contact finger 353 for engagement with a button 355 and the underside of the plate 115, the switch being normally held open by a spring 356, diagrammatically shown in Fig. 52. With this arrangement, switch 342 having been closed, when the plate 348 is moved in a clockwise direction, Fig. 11, against the action of the spring 352 to disengage the stop portion 351 of the finger from the underside of the plate 115, the contact finger of the switch 345 will engage the underside of the plate 115 and close the switch thereby starting the motor. Upon release of the plate 348 the spring again moves the stop portion 351 against the underside of the bracket, whereupon the switch is opened.

Figure 13:
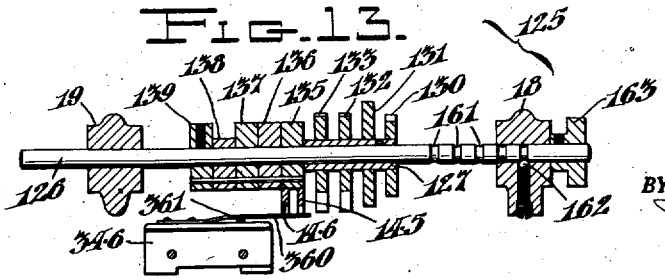
Fig. 13 is a sectional view taken along the line 13—13 of Fig. 6.
Figure 36:
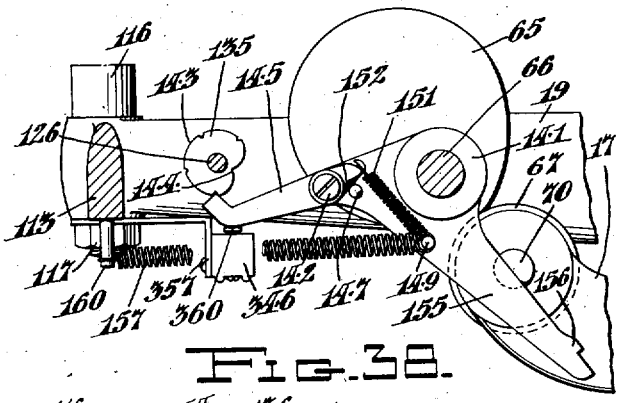
Fig. 36 is a detailed view of one of the control cams and associated mechanism operated by the pawl and ratchet arrangement of Fig. 35.

The switch 346, secured to a bracket 357 carried by the nut and bolt device 117, Figs. 14 and 36, is provided with a resilient finger 360 for engagement with a button 361 and is operated by the levers 145 and 146, Fig. 13. In Fig. 52, the cam 135, which is representative of the group of cams 135 to 138, although indicated as being carried by the motor shaft is in actuality only operated thereby through the medium of intermediate linkage; whereas the lever 146, which is representative of the levers 145 and 146, and although shown diagrammatically in Fig. 52 as being connected directly to the finger 360 cooperates therewith in the manner shown in Fig. 13. When the cam 135 is rotated by the motor 76 to move the low surface 144 from beneath the lever and to move the high surface therebeneath, the switch 346 is closed so that although the operator releases the plate 348, thereby opening the switch 345, the motor 76 will remain in operation until the low surface 144 is again moved to position beneath the lever 146, thereby opening switch 346. The air pump 197 is connected to the service circuit 316 by the conductor 340, the switch 342 and a conductor 362, the latter being connected to the service circuit by a fuse 363; said circuit functioning to maintain the pump 197 in operation while the switch 342 is closed.

To set the device into operation, the operator closes the main switch 317 from the supply lines 318 to the service circuit 316, the switches 323 and 336 to heat the upper and lower platens or shoes 36 and 87, respectively, and the switch 342 to start the air pump 197 and to energize the conductor 340 to the motor 76. The operator then operates the plate 348 (Figs. 2 and 3), which is placed convenient to his hand, to close the switch closing the circuit through the conductors 340 and 341 to start the motor 76 and the cam shaft 66 to bring the upper head 20 downwardly into contact with lower head 21 and to rotate the pawl 140 to turn one of the cam members 135 to 138 from the position in which the levers 145 and 146 are in engagement with a notch in a low cam surface 144 to the position in which the levers are in engagement with a notch in a high cam surface 143; the levers 145 and 146 consequently engaging the contact finger 360 of the switch 346 to close this switch, so that although the operator releases the plate 348 to open the switch 345, the switch 346 will maintain the motor circuit closed.

As the arm 17 is moved in a counterclockwise direction by the cam 65 to move the upper head 20 downwardly toward the lower head 21, the roller 237 (Fig. 18) engages the arm 236 of the latch member 226 to swing the lever 222 in a clockwise direction; the collar 220, carried by the lever, operating the valve stem 212 to press the valve member 215 into the air passage 202 thereby closing the suction line between the motor 197 and the nozzle member 182 on the arm 176. As the suction from the pump 197 is cut off, the outside air passes through the grooves 218 in the valve stem 212, whereupon the label 23 will be released from the nozzle element 182 to drop upon the article or garment over the lower die head 21.

Upon continued downward movement of the arm 17 the roller 195 (Fig. 19), carried thereby, engages the lever 191, carried by the bearing portion 172 (Fig. 20) of the arm 176, to turn the arm in a counterclockwise direction, and the roller 237 moves past the latch member 226, permitting the spring 231 to bias the lever 222 in a counterclock direction to release the valve stem 212 and the member 215 from the air passage 202 and to again apply suction to the nozzle element on the arm 171. The arm 17 continues to move downwardly until the roller 195 on the arm has reached the portion 194 of the lever 191, at which time the arm 176 has been moved to its position shown in Fig. 9 in which the nozzle 182 is in register with the label magazine 170. Upon continued movement of the arm 17, the roller 245 (Fig. 19) engages the lever 246 which in turn engages the finger 181 (Fig. 26) of the arm 176, thereby pressing the nozzle element 182 into engagement with the labels 23 in the supply magazine. At the same time that the arm 176 presses the nozzle element 182 into engagement with the labels 23, the lever 311 (Figs. 45 and 46) actuates the pawl lever 297 to pawl the ratchet 295 and press the pusher plate 277 against the rearmost labels to advance the labels toward the nozzle element, thereby insuring that the foremost label will be engaged by the nozzle element. At this time the upper head 20 is also in position to vulcanize, affix or unite the label to the garment and is so held by the latching engagement of the extension 155 (Fig. 10) of the lever 141 with the shaft 70 on the arm 17.

With the arm 17 under the control of one of the cam members 135 to 138, the upper die head 20 will be retained in vulcanizing position for a predetermined number of revolutions of the cam shaft 66, at which time the pawl 140 will have rotated the low surface 144 of the cam member into engagement with the levers 145 and 146, this action disengaging the shouldered portion 156 from the shaft 70 to permit the arm 17 to move upwardly and disengage the levers 145 and 146 from the plate 360 of the switch 346 to break the motor circuit and bring the motor 76 to a stop. However, after the switch 346 is opened and before the motor comes to a stop, the inertia of the motor turns the shaft 66 so as to position the low portion of the cam 65 opposite the cam follower 67, thereby permitting the spring 68 to raise the arm 17 to its starting position shown in Figs. 2 and 7. During this upward movement of the arm 17, the roller 245 disengages the lever 246 permitting the spring 188 to withdraw the nozzle element 182 and the foremost label from the magazine, Fig. 27, whereupon the spring 192 biases the lever 191 in a clockwise direction, as controlled by the engagement of the upwardly moving roller 195 with the lever 191, to move the arm 176 and therefore the label downwardly into label releasing position. As the arm 17 continues to move upwardly, the roller 237 engages the arm 236 of the latch member 226, turning the latch member in a counterclockwise direction against the action of the spring 228, permitting the roller 237 to move past the latch member without effecting the operation of the valve 201 to release the label. After the arm 17 has reached its raised or inoperative position the device remains idle until the operator again depresses the plate 348 to close the circuit to the motor.

Of course, the improvements specifically shown and described by which I obtain the above results, can be changed and modified in various ways without departing from the invention herein disclosed and hereinafter claimed.

I claim:

1. A machine of the character described having a magazine arranged to hold a stack of labels treated with heat softened adhesive, a heated platen, and means, including a pivotally mounted transfer head and a presser head, arranged to draw a label from said stack and to press it against an article on said heated platen to affix the label to the article.

2. A machine of the character described for permanently affixing labels to cloth which comprises drive means, means for pressing a label having a heat softened water-proof adhesive thereon against a cloth surface, means for varying the period of said pressing action during constant speed operation of said drive means, and means for simultaneously heating the adhesive to unite the label to said surface.

3. A machine of the character described having a magazine arranged to hold a stack of labels, a platen, means, including a pivotally mounted transfer head and a presser head, arranged to draw a label from said stack and to press it against an article on said platen to affix the label to the article, and means for varying the time pressure is applied to the label.

4. A labelling machine having a magazine arranged to hold a stack of labels, a heated platen, a presser head arranged for motion toward and from said platen to press an article thereagainst, and a pivotally mounted suction head arranged to remove the label from said magazine and to place it in position for said presser head to press it against an article on said platen.

5. A stamping machine comprising a fixed arm projecting above a table, a movable arm having a movable stamping head thereon arranged for pressing a label against an article on said table, a magazine for holding labels, a suction head supported from said fixed arm and arranged to swing between said magazine and the area of contact between said stamping head and the table, and means whereby the movement of said stamping head swings said suction head between the magazine and a point beneath the stamping head in timed relation to place a label on an article on the said area and to remove the suction head from the path of the stamping head.

6. A stamping machine having a magazine for labels, means to periodically feed the stack forward in the magazine, a transfer means pivotally mounted on a stationary part of the machine and arranged to swing in an arc to and from one end of said magazine, a pivoted arm having a different axis of rotation than said transfer means, and means whereby movements of said arm swing said transfer means.

7. A stamping machine having a magazine for labels, a suction head for withdrawing labels from said magazine, a hollow arm having a swinging motion, an arm extending laterally of the plane of motion of said arm and on which said head is mounted, a joint between said two arms to permit the head to be pressed against a label in the magazine, a stamping head, a movable arm on which said stamping head is mounted, a fixed arm adjacent said last mentioned arm when the stamping head is in its uppermost position, a lever pivoted on said fixed arm and arranged to contact the arm on which said suction head is mounted, and means on the arm on which said stamping head is mounted arranged to act on said lever to press said suction head against a label in the magazine.

8. In a stamping machine, a magazine adapted to hold a stack of labels and having an open mouth, a traveller in said magazine adapted to push said stack toward said mouth, a friction drive for said traveller adapted to slip when the traveller is opposed by a materially greater force than that caused by the stack per se, and means to operate said drive periodically.

9. In a stamping machine, a magazine adapted to hold a stack of labels and having an open mouth, a traveller in said magazine adapted to push said stack toward said mouth, a friction drive for said traveller adapted to slip when the traveller is opposed by a materially greater force than that caused by the stack per se, means to operate said drive periodically, a suction head, and means to bring said head into contact with the stack for a time during the period said drive is in action.

10. In a stamping machine, the combination of a magazine having an open discharge end, means to feed stock toward said end, a suction head, means to thrust said head into said discharge end to remove a label therefrom, and means to operate said feeding means at times said head is within said end.

11. In a labelling machine, a label handling device comprising, a swinging arm, an arm extending laterally of the plane of motion of said first arm, a flexible joint between said arms, and a suction head at the end of said second arm.

12. In a labelling machine, two cooperating heating platens including a movable platen, and means actuated by said movable platen for inserting a label between said platens.

13. In a stamping machine, a pair of relatively movable platens, means for moving said platens to a position for pressing an article between them, and pattern timing control means for determining the period said platens remain in press position.

14. In a stamping machine, a pivoted arm having a stamping head thereon, means to move said arm to swing said head toward and from a press position, and control means to automatically latch said head in said press position.

15. In a stamping machine, in combination, a curved arm pivoted intermediate its ends, a stamping head carried on one end of said arm, means for throwing said head toward and from a press position including a cam acting on the other end of said arm, and a means to latch the arm with the head in press position.

16. In a stamping machine, in combination, a shaft, a motor for driving said shaft, a pivoted arm having a stamping head thereon, means for moving said arm to swing said head toward and from a press position and including a cam driven by said motor, latch means for holding said arm and said head in press position, and means driven by said motor for releasing said latch and for stopping said motor.

17. In a stamping machine, a stamping head, means for throwing said head toward and away from a press position and for automatically holding the head in the press position, and control means adapted to vary the holding time of said means.

18. In a machine of the class described, a timing mechanism comprising a shaft having a timing cam thereon provided with high and low sections, a motor driven shaft, means whereby said motor driven shaft turns said first shaft intermittently while the motor is running, and means for stopping said motor whenever a low section of the timing cam occupies a given angular position.

19. In a machine of the class described, a timing mechanism comprising a shaft having a series of timing cams thereon and longitudinally shiftable to select for operation a particular cam as desired, each of said cams provided with high and low sections both with notches therein, a motor driven shaft, means whereby said motor driven shaft turns said first shaft intermittently and through an angular distance at each turn equal to that between two adjacent ones of said notches on the selected cam.

20. In a stamping machine, the combination of a table, a fixed arm extending above said table and having transfer means mounted thereon, a pivoted arm mounted to move in a vertical plane parallel to said fixed arm, and means whereby the movement of said pivoted arm moves said transfer means.

21. In a stamping machine, the combination of a table, a fixed arm extending above said table and having a magazine supported therefrom, a pivoted arm mounted to move in a vertical plane parallel to said fixed arm, and means whereby the movement of said pivoted arm may move a stack of labels in said magazine.

22. In a stamping machine, the combination of a table, a fixed arm extending above said table and having transfer means mounted thereon, a pivoted arm mounted to move in a vertical plane parallel to said fixed arm, means whereby the movement of said pivoted arm moves said transfer means, a magazine supported from the fixed arm, and means whereby the movement of the pivoted arm may move a stack of labels along said magazine.

23. The method of operating a stamping machine for feeding separate objects treated with heat softened adhesive from a bulk supply to articles of manufacture and permanently attaching them thereto comprising assembling a plurality of thin objects on edge and one against the other, removing said objects from said edge position one at a time, swinging each object immediately after removal from said edge position through an arc to a work position in which the object is at an angle to said edge position, placing the object in position on an article of manufacture to be worked on, and heating said object to permanently attach it to said article of manufacture.

24. The method of handling a body of thin articles treated with heat softened adhesive comprising arranging the articles on edge and one against the other, feeding the articles in a generally horizontal direction on their edges and, in quick succession, removing the articles from their edge position one at a time, swinging the article through an arc to a position at an angle to its position when on edge, placing the article on a fabric in said second position, and heating said article while applying pressure thereto to permanently attach it to said fabric.

25. A stamping machine having a trough-like magazine arranged with its axis generally horizontal, a pusher in said magazine arranged to sustain a stack of thin articles on one edge, and frictionally operated means to move said pusher along the magazine to feed the articles toward one end thereof while resting on their one edges.

26. A stamping machine as set forth in claim 25 and having means for removing the articles from the said end of the magazine one at a time and for swinging the articles through an arc to a stamping position.

27. In a machine for applying indicia carrying members to preformed articles, a platen having a generally up and down movement, and means adapted and arranged to feed an indicia carrying member to a position beneath said platen, said feed means being actuated by the movement of said platen.

28. A machine of the character described having a magazine arranged to hold a stack of sheet-like articles, a support member, and means, including a pivotally mounted transfer head and a presser head, arranged to draw an article from said stack and place it in position to be acted upon by said presser head, said transfer head being operated by the movement of said presser head.

29. A machine of the character described for permanently affixing gummed elements to coth which comprises drive means, means for pressing an element having a heat softened adhesive thereon against a cloth surface, control means for selectively varying the period of said pressing action during constant speed operation of said drive means, aand means for simultaneously heating the adhesive to unite the element to said surface.

30. In a stamping or labeling machine, the combination of a magazine, means for feeding along a given line a group of thin objects set on edge in said magazine, and a transfer means having an arm arranged to swing about an axis, an arm attached to said arm at the end thereof farther from said axis and projecting in a line having a material component parallel to said axis, means whereby the free end of said second arm may be brought into pressure contact with the end one of the objects in said magazine, means for establishing suction between said free end and said end article, and means for swinging said first arm about said axis to bring said end object to a work position in which it is at a substantial angle to its position in said magazine.

31. In a stamping or labeling machine, the combination of a magazine having a group of thin objects therein in parallel contacting arrangement, means to feed said objects along a given line in said magazine, a work station, a transfer means arranged to swing the most advanced one of the objects in said magazine from the magazine to said work station, and a stamping platen for operating on an object at the work station and which moves generally in a line at a pronounced angle to the line along which said objects move in said magazine.

32. In a machine for applying label-like elements, the combination of a magazine, means for feeding a group of thin parallel label-like elements along a given line in said magazine at a substantial angle to the planes of the elements, a work station, and a transfer means for transporting said elements one-by-one from said magazine to said work station and for depositing them at the work station at a material angle to the position occupied in said magazine, said transfer means having an arm mounted to oscillate in a plane at right angles to an axis of oscillation generally parallel to the elements, means whereby an end one of said elements may be attached to said arm and held thereon at a fixed angle during movement of said arm, and means to release said element from the arm at said work station.

33. A machine for affixing label like objects to other articles which comprises drive means, means operated by said drive means for pressing a label like object having a heat softened waterproof adhesive thereon against an article to which it is desired to attach it, means for simultaneously heating the adhesive to unite said object to said article, means receiving motion from said drive means for determining the period said pressing means acts on a given object, and means whereby said determining means may be adjusted to vary the period of action of said pressing means for a given speed of operation of said drive means.

34. A label holding means for label applying machines comprising a supporting member, means for removably mounting said member in said machine, a label hopper carried by said supporting member for containing a supply stack of labels, and means whereby said hopper may be adjusted to accommodate labels of varying dimensions.

35. In a labeling machine for applying adhesive coated labels under heat, the combination of means for transporting an adhesive coated label over a predetermined path from a label transfer station to an applying station definitely related to said transfer station for positive application to an article in its intended position thereon at said applying station, means for supporting said label at said label transfer station in accurate label receiving relation to said transporting means to predetermining the applying position of said label to said article, and means for applying heat directly to said label to effect the application thereof to said article at said applying station.

36. In a machine of the class described, a trough-like magazine one end of which serves as a transfer station, a pusher in said magazine arranged to contact one face of a stack of thin articles, frictionally operated means to move said pusher along the magazine to feed the articles toward said end thereof, a picker arm means having a nozzle element and including means to operate said nozzle element to present it toward the free face of said stack, and means to operate said frictional means to press said stack against said element when so presented.

37. In a machine of the class described, a trough-like magazine one end of which serves as a transfer station, a pusher in said magazine arranged to contact one face of a stack of thin articles, frictionally operated means to move said pusher along the magazine to feed the articles toward said end thereof, a picker arm means having a nozzle element and including means to operate said nozzle element to present it toward the free face of said stack, means to move said nozzle element directly toward the free face of said stack, and means to operate said frictional means to press said stack against said element.

38. A label holding means for label applying machines comprising a base plate; means for removably mounting said plate in said machine including a portion of said plate and a fixed member adapted to hold the weight of said plate and any parts thereon; a label hopper supported by and including another portion of said plate for containing a supply stack of labels; and means whereby said hopper may be adjusted to accommodate labels of varying dimensions.

FRED AUTEM.